A. S. DIACK.
MIXING BOWL.
APPLICATION FILED JULY 17, 1920.

1,394,540. Patented Oct. 25, 1921.

Inventor
Alexander S. Diack

By Whittemore Hulbert and Whittemore
Attorneys

UNITED STATES PATENT OFFICE.

ALEXANDER S. DIACK, OF DETROIT, MICHIGAN.

MIXING-BOWL.

1,394,540.    Specification of Letters Patent.    Patented Oct. 25, 1921.

Application filed July 17, 1920. Serial No. 396,998.

*To all whom it may concern:*

Be it known that I, ALEXANDER S. DIACK, a citizen of the United States of America, residing at Detroit, in the county of Wayne and State of Michigan, have invented certain new and useful Improvements in Mixing-Bowls, of which the following is a specification, reference being had therein to the accompanying drawings.

The invention relates to mixing bowls, such as are commonly employed by dentists and others to mix and hold plastic material.

Such bowls, as hitherto constructed, are required either to maintain their normal upright position, which position is not best suited for a ready removal of the mixture, or must be manually held in the tilted position, which permits the most convenient access to the contents of the bowl.

It is the object of the present invention to provide a mixing bowl which can assume and maintain either the ordinary upright position and which when tilted upon its side will maintain the tilted position under a stable equilibrium, so that the contents of the bowl may be removed under the most advantageous conditions and yet leave both hands of the operator free for the work in which he is engaged.

Figure 1:
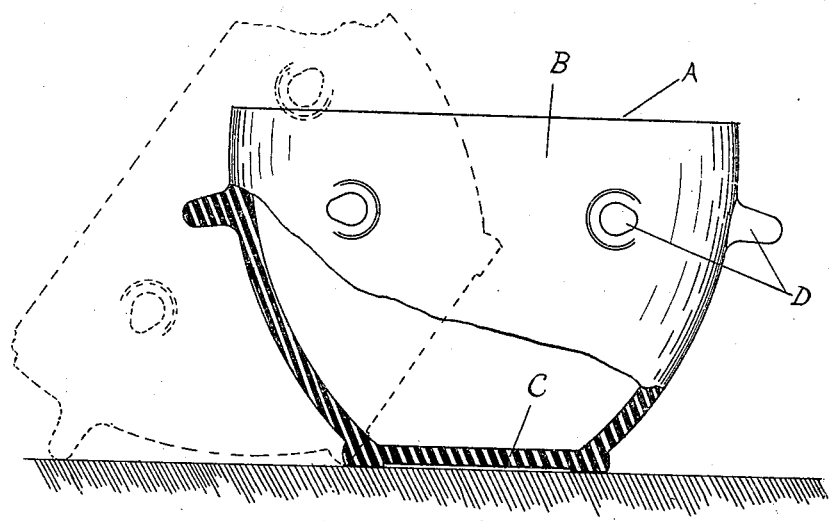
Figure 2:
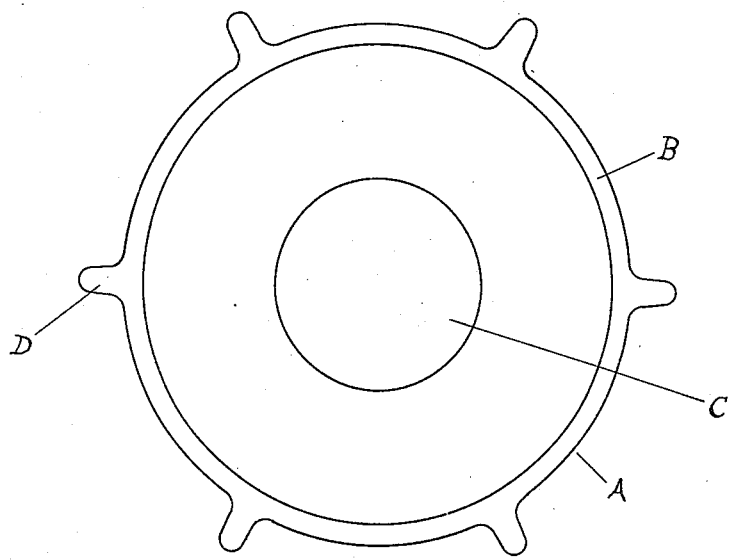

In the accompanying drawings:

Figure 1 is a view in side elevation, partially broken away and in section, of a mixing bowl, which embodies features of the invention with a dotted outline figure showing the bowl in tilted position; Fig. 2 is a plan view of the bowl.

In these views the reference character A designates a mixing bowl having an upwardly flaring side wall B and the flat bottom C. The side wall B is exteriorly formed at a short distance below the edge of the bowl with a series of integral equidistant protuberances D, having rounded ends. Normally the described bowl maintains an upright position, the bottom C providing a bearing surface. When however, it is desired to facilitate removal of the contents of the bowl, the same is tilted upon its side as is shown in Fig. 2, having in such position a multiple point support, one point being provided by the bottom C and the other two by any two adjacent protuberances D. When so tilted, the protuberances D respectively counteract any tendency of the bowl to roll laterally, and return of the bowl to its normal upright position is resisted by the weight of the contents, which upon tilting of the bowl, shift by gravity to that portion of the side adjacent the supporting surface. Thus, ready access is had to the contents of the bowl and the desired tilted position thereof is maintained without requiring any effort or attention from the operator who may thus devote both of his hands to his work.

While it is preferred to form the disclosed bowl of resilient and yielding material, such as rubber, the improvement is equally applicable to a bowl of any material. Also the protuberances D are not necessarily integral, although this is the preferred construction. It is to be noted that these protuberances may take numerous forms, other than that disclosed by the drawing, without departing from the spirit of the invention.

What I claim as my invention is:

1. A mixing bowl having a base rim and a plurality of projections from its side, the rim and any two adjacent projections forming supporting points for maintaining the bowl in stable equilibrium when tilted upon its side.

2. A mixing bowl having an upwardly flaring side wall, a bearing face for supporting said bowl in normal upright position and having a rim, and a plurality of circumferentially spaced protuberances formed exteriorly upon said side wall and adapted to coöperate with the rim to support the bowl in a tilted position.

3. A mixing bowl having a circular base and side wall, the latter having a series of regularly disposed projections, any two adjacent projections coöperating with the rim to form a three-point support for maintaining the bowl in stable equilibrium when tilted.

In testimony whereof I affix my signature.

ALEXANDER S. DIACK.